United States Patent
Kaneshige et al.

(10) Patent No.: US 10,666,101 B2
(45) Date of Patent: May 26, 2020

(54) ROTOR FOR ROTARY ELECTRIC MACHINE

(71) Applicant: TOYOTA JIDOSHA KABUSHIKI KAISHA, Toyota-shi, Aichi-ken (JP)

(72) Inventors: Keiichi Kaneshige, Seto (JP); Yuma Ishikawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 266 days.

(21) Appl. No.: 15/921,986

(22) Filed: Mar. 15, 2018

(65) Prior Publication Data

US 2018/0269735 A1   Sep. 20, 2018

(30) Foreign Application Priority Data

Mar. 16, 2017 (JP) ................... 2017-051869

(51) Int. Cl.
  *H02K 1/28*   (2006.01)
  *H02K 1/27*   (2006.01)
  *H02K 15/03*  (2006.01)

(52) U.S. Cl.
  CPC .............. *H02K 1/28* (2013.01); *H02K 1/276* (2013.01); *H02K 1/2766* (2013.01); *H02K 15/03* (2013.01)

(58) Field of Classification Search
  CPC ............ H02K 1/28; H02K 1/27; H02K 15/03; H02K 1/2766; H02K 1/276
  See application file for complete search history.

(56) References Cited

U.S. PATENT DOCUMENTS

| | | | |
|---|---|---|---|
| 2011/0000079 A1* | 1/2011 | Fukumaru ............ | H02K 1/2766 29/598 |
| 2011/0050022 A1* | 3/2011 | Li ........................ | H02K 1/276 310/156.46 |
| 2012/0248920 A1* | 10/2012 | Takahashi .............. | H02K 1/276 310/156.61 |
| 2016/0013709 A1* | 1/2016 | Nagai .................... | H02K 15/03 310/156.08 |

FOREIGN PATENT DOCUMENTS

JP      2015-056911 A      3/2015

* cited by examiner

*Primary Examiner* — Naishadh N Desai
(74) *Attorney, Agent, or Firm* — Sughrue Mion, PLLC

(57) ABSTRACT

A rotor for a rotary electric machine includes a rotor core including at least one low-rigidity portion rigidity; a plurality of magnets; a rotary shaft; a washer contacting at least one end surface of the rotor core in an axial direction of the rotor core; and a nut. An outer circumferential end of the washer is disposed more radially inward than the magnet holes, the washer has an outer circumferential shape with recesses and projections in which a distance from a rotation center to the outer circumferential end of the washer periodically varies, and a distance from the outer circumferential end of the washer to each low-rigidity portion is greater than a distance from the outer circumferential end of the washer to each magnet hole.

12 Claims, 7 Drawing Sheets

ROTOR FOR ROTARY ELECTRIC MACHINE

CROSS-REFERENCE TO RELATED APPLICATIONS

The disclosure of Japanese Patent Application No. 2017-051869 filed on Mar. 16, 2017 is incorporated herein by reference in its entirety.

BACKGROUND

1. Technical Field

The present specification discloses a rotor for a rotary electric machine with a washer interposed between a nut screwed onto a rotary shaft and a rotor core.

2. Description of Background Art

In general, a rotor core is composed by stacking a plurality of magnetic steel plates. It has been conventionally proposed that such a rotor core is fastened by a nut screwed onto a rotary shaft so as to apply a compression force in the axial direction to the rotor core. Further, it has also been proposed that a generally annular washer is interposed between this nut and the rotor core. By interposing the washer therebetween, a fastening force by the nut is applied to the rotor core via this washer. Normally, the rotary shaft is inserted through the washer, and an outer circumferential end of the washer is located more radially inward than the magnets so as to prevent magnetic short-circuit.

Meanwhile, usually, a rotor core is formed with a plurality of magnet holes extending through the rotor core in the axial direction so as to insert magnets into these magnet holes. In addition to the magnet holes, the rotor core is also formed with through-holes used for regulating magnetic flux flows and forming magnetic resistance, in some cases. Due to these through-holes, there are low-rigidity portions the rigidities of which are locally decreased in the rotor core. For example, in order to arrange two magnets in a V-shape, two magnet holes in a V-shape are formed in the rotor core. It can be said that a fine gap between these two magnet holes, that is, a portion referred to as a bridge is a low-rigidity portion the rigidity of which is locally decreased. Japanese Patent Application Publication No. 2015-56911 mentions a rotor having such bridges.

SUMMARY

When a washer is pushed against an axial end surface of the rotor core, a stress is generated inside the rotor core due to this pushing force (axial force). If a position pushed by the washer is close to low-rigidity portions, a stress is concentrated onto these low-rigidity portions, so that deterioration or breakage is caused to the low-rigidity portions. Hence, conventionally, a generally annular washer is configured to have a smaller diameter so as not to set its outer circumferential end too close to the low-rigidity portions. Unfortunately, when the washer is configured to have a smaller diameter, a contact area between the washer and the rotor core becomes smaller, and thus there is such a concern that a sufficient axial force cannot be applied to the entire rotor core.

To cope with this, the present disclosure provides a rotor for a rotary electric machine capable of reducing stress applied to low-rigidity portions, while securing a sufficient axial force.

An example aspect of the present disclosure is a rotor for a rotor for a rotary electric machine. The rotor for a rotary electric machine includes: a rotor core being a generally annular shape having a shaft hole at a center, the rotor core having a plurality of magnet holes arranged in a circumferential direction, the rotor core including at least one low-rigidity portion the rigidity of which is locally decreased in the rotor core; a plurality of magnets disposed in the respective magnet holes; a rotary shaft fixedly attached to the shaft hole of the rotor core; a washer tight contacting with at least one end surface in an axial direction of the rotor core; and a nut screwed onto the rotary shaft such that the washer is pushed against the rotor core. An outer circumferential end of the washer is disposed more radially inward than the magnet holes. The washer has an outer circumferential shape with recesses and projections in which a distance from a rotation center to the outer circumferential end of the washer periodically varies. A distance from the outer circumferential end of the washer to each low-rigidity portion is greater than a distance from the outer circumferential end of the washer to each magnet hole.

By configuring the washer to have an outer circumferential shape with recesses and projections in which the distance from the rotation center to the outer circumferential end periodically varies, and by setting a distance from the outer circumferential end of the washer to each low-rigidity portion to be greater than the distance from the outer circumferential end of the washer to each magnet hole, it is possible to apply an axial force in a wide range of the rotor core, while suppressing stress concentration onto the low-rigidity portions. As a result, it is possible to reduce stress applied to the low-rigidity portions, while securing a sufficient axial force.

The rotor core may include a plurality of pairs of magnet holes in the circumferential direction, each pair of the magnet holes arranged in a V-shape opening radially outward. Each bridge as a fine gap may be provided in between each pair of the magnet holes, and the low-rigidity portion may be the bridge.

With such a configuration, also in the rotor including the magnets disposed in a V-shaped arrangement, it is possible to reduce stress applied to the low-rigidity portions, while securing a sufficient axial force.

The rotor core may include the magnet holes, each magnet hole being long in the circumferential direction, and the low-rigidity portion may be the gap between the magnet holes adjacent to each other in the circumferential direction.

With such a configuration, also in the rotor including the magnets disposed in an I-shaped arrangement, it is possible to reduce stress applied to the low-rigidity portions, while securing a sufficient axial force.

The washer may be disposed such that in the same phase as a phase of each low-rigidity portion, a distance from the rotation center to the outer circumferential end becomes minimum.

Through this, the distance from the outer circumferential end of the washer to each low-rigidity portion can be easily greater, to thus more securely suppress stress concentration onto the low-rigidity portions.

The rotor core may have a plurality of sets of through-holes in the circumferential direction, each set of the through-holes including: a pair of the magnet holes arranged circumferentially adjacent to each other in a V-shape opening radially outward; and an intermediate hole being disposed between the pair of the magnet holes. Each low-rigidity portion may be a bridge that is the fine gap between each magnet hole and each intermediate hole.

With such a configuration, even in the rotor formed with the intermediate holes, it is possible to reduce stress applied to the low-rigidity portions, while securing a sufficient axial force.

The washer may be disposed such that in the same phase as a phase of the intermediate hole, the distance from the rotation center to the outer circumferential end becomes minimum.

Through this, the distance from the outer circumferential end of the washer to each low-rigidity portion can easily be greater, to thus more securely suppress stress concentration onto the low-rigidity portions.

The outer circumferential shape of the washer may be a gear-like shape having round corners.

The outer circumferential shape of the washer does not have sharp corners, to thus prevent overconcentration of stress onto a single local position.

One of an inner circumferential surface of the washer and an outer circumferential surface of the rotary shaft may include a key-projection projecting to the other circumferential surface, and the other of the inner circumferential surface of the washer and the outer circumferential surface of the rotary shaft may have a key-groove accepting the key-projection.

With such a configuration, it is possible to securely restrict the phase of the washer relative to the rotor core.

According to the above configuration, it is understood that the washer has an outer circumferential shape with recesses and projections in which the distance from the rotation center to the outer circumferential end periodically varies, and the distance from the outer circumferential end of the washer to each low-rigidity portion is set to be greater than the distance from the outer circumferential end of the washer to each magnet hole. It is possible to apply an axial force in a wide range of the rotor core, while suppressing stress concentration onto the low-rigidity portions. Accordingly, it is possible to reduce stress applied to the low-rigidity portions, while securing a sufficient axial force.

BRIEF DESCRIPTION OF THE DRAWINGS

Features, advantages, and technical and industrial significance of exemplary embodiments of the disclosure will be described below with reference to the accompanying drawings, in which like numerals may denote like elements, and wherein.

DETAILED DESCRIPTION OF EMBODIMENTS

Figure 1:
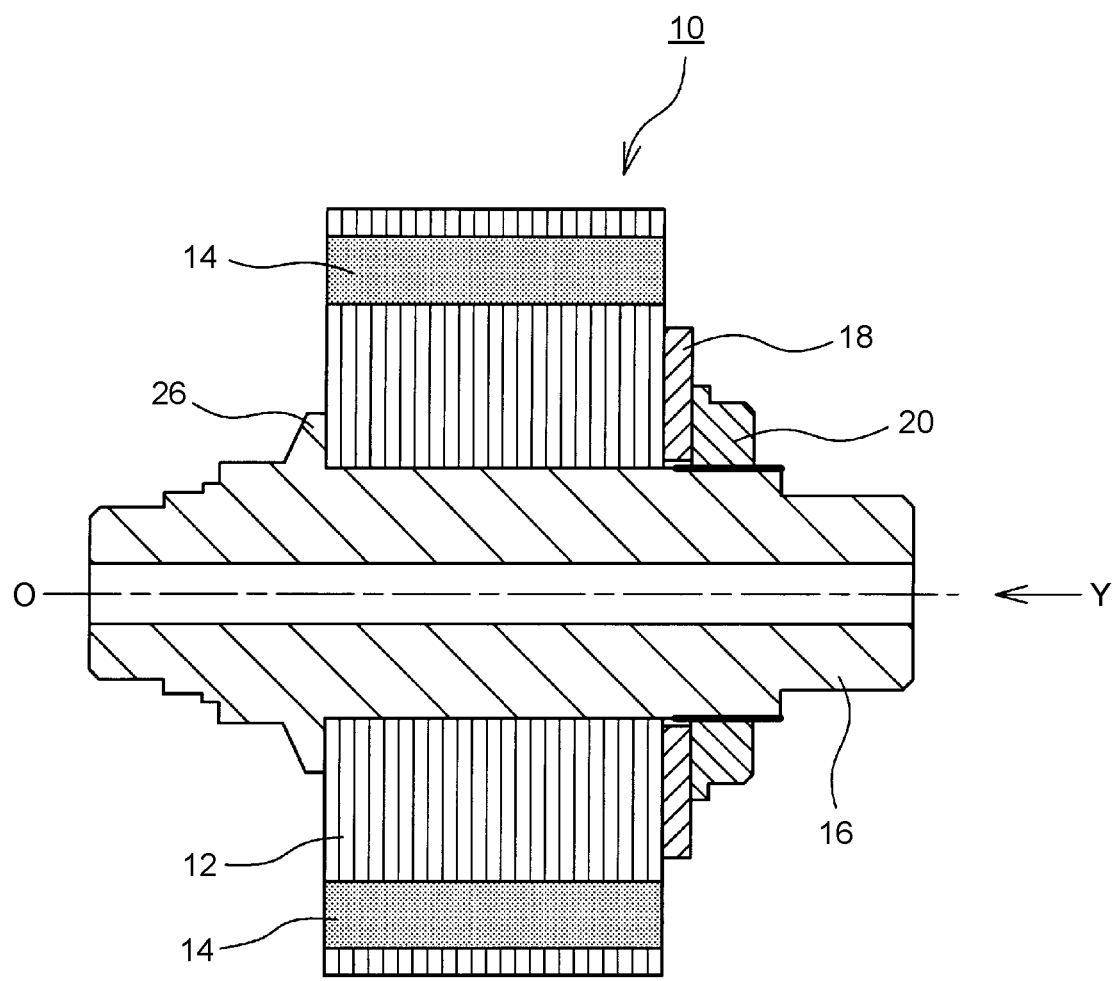
FIG. 1 is a schematic longitudinal sectional view of a rotor according to an exemplary embodiment.
Figure 2:
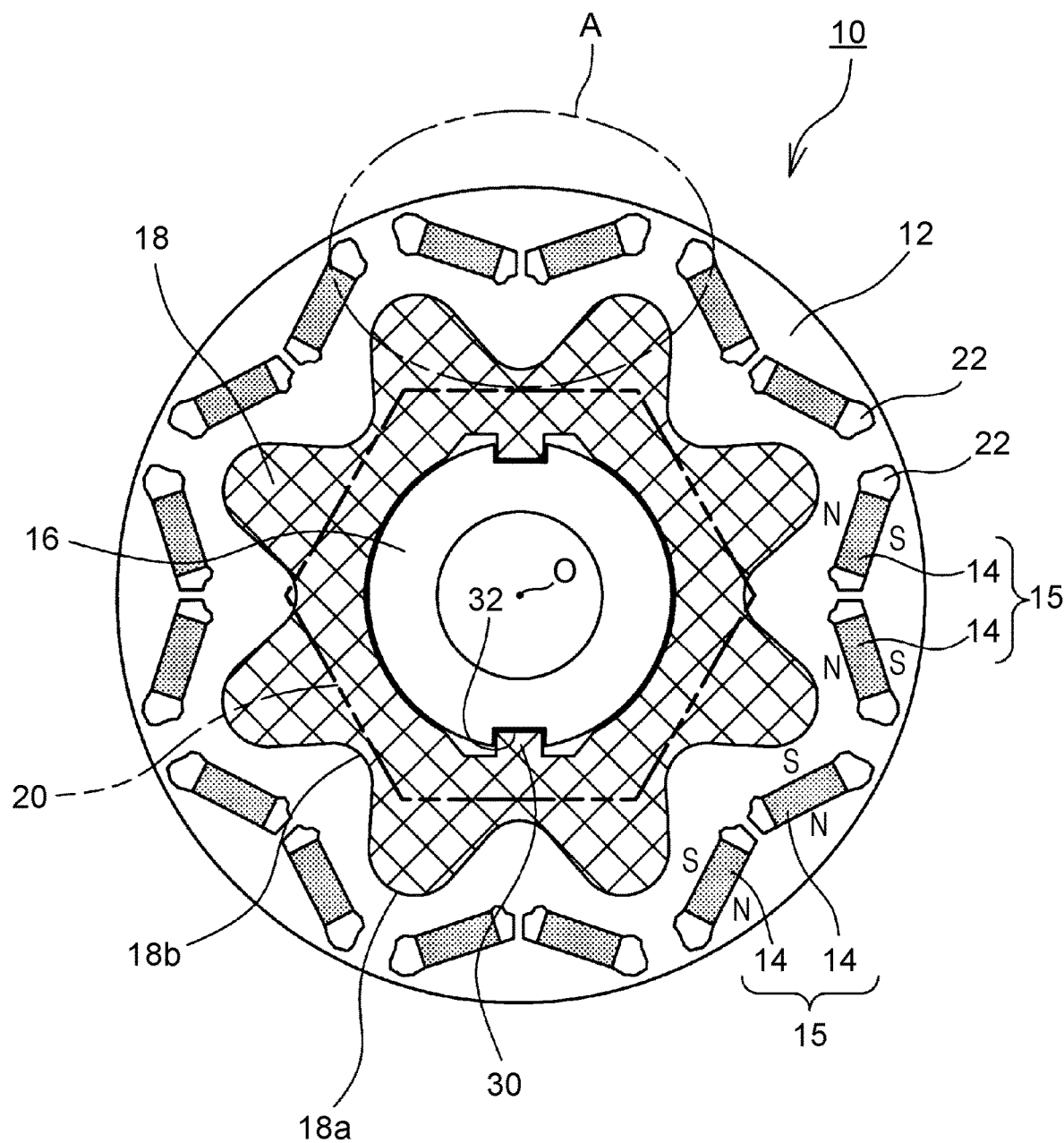
FIG. 2 is a view of the rotor as viewed from a Y direction.
Figure 3:
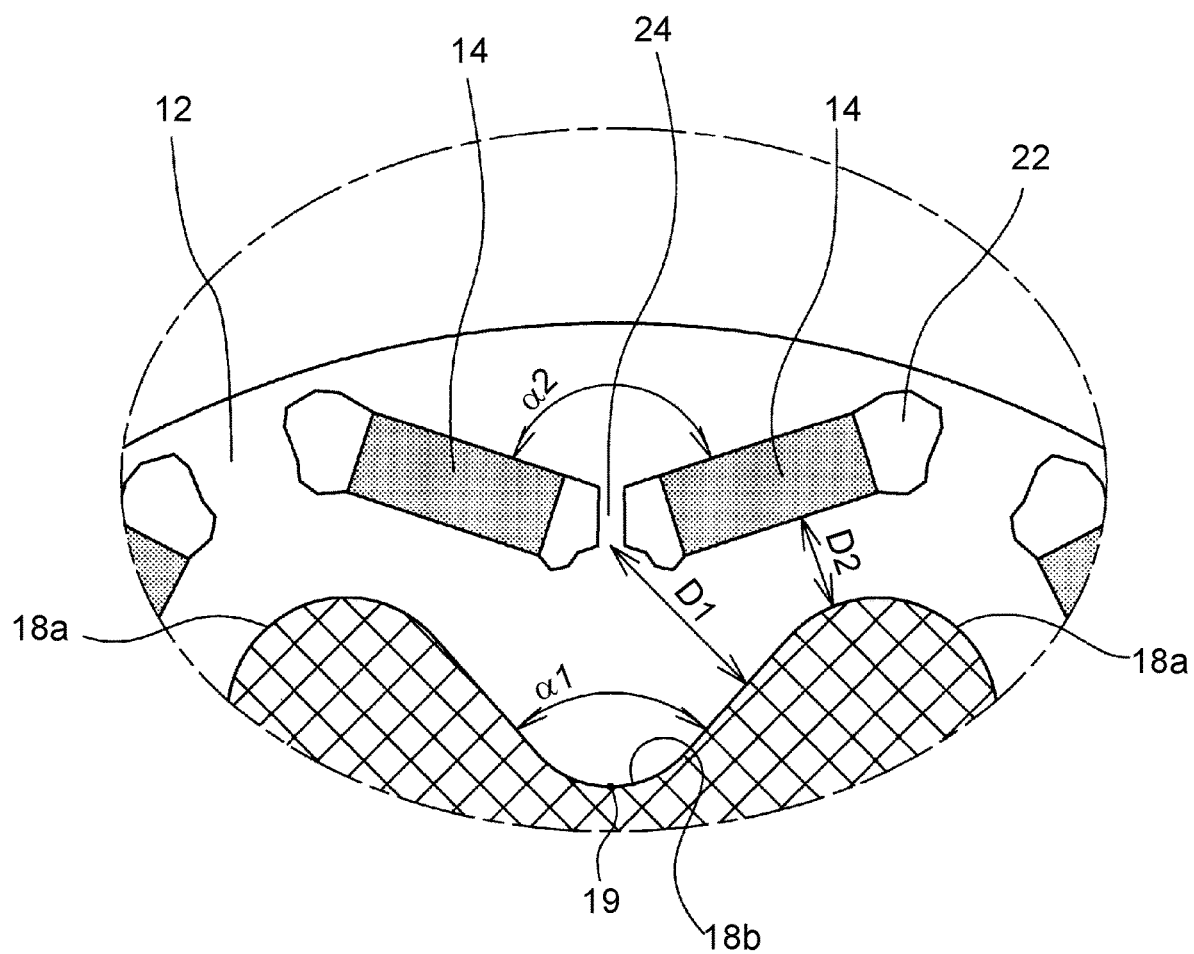
FIG. 3 is an enlarged view of a part A of FIG. 2.

Hereinafter, a configuration of a rotor 10 for a rotary electric machine will be described with reference to drawings. FIG. 1 is a schematic longitudinal sectional view of the rotor 10. FIG. 2 is a view of the rotor 10 as viewed in a Y direction. In FIG. 2, an outline of a nut 20 is illustrated by a two-dot chain line. FIG. 3 is an enlarged view of a part A of FIG. 2.

This rotor 10 is used for a rotary electric machine, for example, a three-phase synchronous rotary electric machine installed in an electric vehicle or the like, as a drive source. The rotor 10 includes a rotor core 12, permanent magnets 14 embedded in the rotor core 12, a rotary shaft 16 fixedly attached to the rotor 10, and a washer 18 and a nut 20 applying an axial force to the rotor core 12.

The rotor core 12 is a generally annular shaped body having a shaft hole at a center thereof. The rotor core 12 is formed by stacking a plurality of electromagnetic steel plates (such as silicon steel plates) in the axial direction. The rotor core 12 is formed with a plurality of magnet holes 22 in the vicinity of an outer circumferential end of the rotor core 12, and the plurality of magnet holes 22 are arranged with intervals in the circumferential direction. Each magnet hole 22 extends through the rotor core 12, and a permanent magnet 14 composing a magnetic pole of the rotor 10 is disposed in an inside of each magnet hole 22.

In this example, the permanent magnets 14 are disposed in a V-shape arrangement. That is, a single magnetic pole 15 is composed by a pair of permanent magnets 14 arranged in a V-shape opening radially outward. In an example of FIG. 2, the rotor 10 has sixteen permanent magnets 14 composing eight magnetic poles 15. Each permanent magnet 14 has a flat and generally rectangular shaped cross section, and is magnetized in its short-axial direction (substantially a rotor-radial direction). Of the permanent magnets 14, permanent magnets 14 composing S-magnetic poles are arranged such that S poles are located radially outward, and permanent magnets 14 composing N-magnetic poles are arranged such that N poles are located radially outward.

The magnet holes 22 are also disposed in a V-shape arrangement so as to accept the permanent magnets 14 disposed in a V-shape arrangement. That is, the rotor core 12 is provided with multiple pairs (eight pairs in the illustrated example) of the magnet holes 22 with equal intervals in the circumferential direction, each pair of the magnet holes 22 being arranged in a V-shape opening radially outward. Each magnet hole 22 has a generally rectangular shape a long axial dimension of which is greater than that of each permanent magnet 14. Hence, when each permanent magnet 14 is inserted into each corresponding magnet hole 22, voids are formed on both sides in the long-axial direction of this permanent magnet 14. Such a void is called a flux barrier, and functions as a magnetic resisting portion so as to regulate magnetic characteristics of the rotor core.

Two magnet holes 22 belonging to the same magnetic pole are close to each other in the circumferential direction, and a bridge 24 that is a fine gap portion is formed between the both magnet holes 22. It can be said that this bridge 24 is a low-rigidity portion rigidity of which is locally decreased in the rotor core 12. To such bridges 24 (low-rigidity portions), stress is likely to be concentrated, so that deterioration or breakage is likely to be caused thereto. Hence, in order to reduce stress concentration onto the bridges 24, the washer 18 is configured to be in a special shape, and this will be described later.

Figure 4:
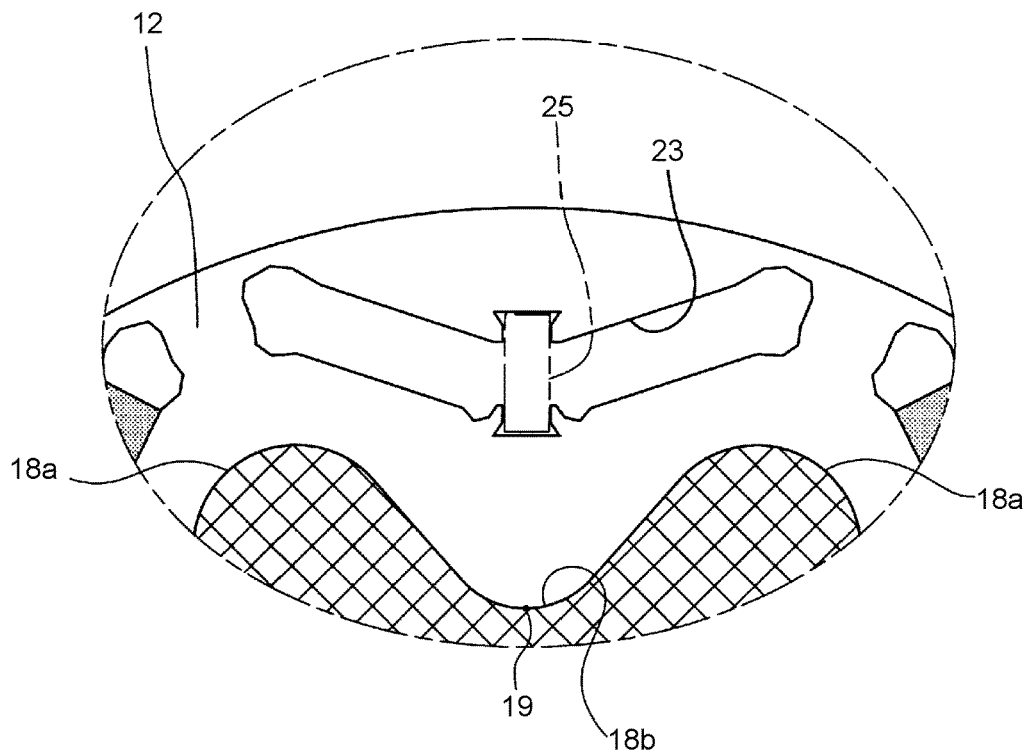
FIG. 4 is a view showing another configuration of a bridge according to another exemplary embodiment.

In this example, each bridge 24 is configured as a part of the rotor core 12, but the bridge 24 may be composed by using a member different from the stacked steel plates composing the rotor core 12. For example, as shown in FIG. 4, it may be configured that a through-hole in a generally V-shape continued in a single line is formed, and a bridge member 25 as indicated by a two-dot line in FIG. 4 may be interposed in a valley portion of this V-shape. In this case, a material of the bridge member 25 is not limited to a specific one, but it is preferable to use a non-magnetic one for this material.

The rotary shaft 16 is inserted into the shaft hole of the rotor core 12, and is fixedly attached thereto. The rotary shaft 16 is rotatably supported via a not-illustrated bearing, and integrally rotates with the rotor core 12. A flange 26 protruding radially outward is formed in the middle of the rotary shaft 16. The rotor core 12 through which the rotary shaft 16 is inserted is pushed against this flange 26.

An outer circumferential surface of the rotary shaft 16, which is located in the vicinity of the opposite side to the flange 26 with the rotor core 12 interposed therebetween, is formed with a male screw. Bold lines in FIG. 1 indicate a position where the male screw is formed. As described later, the nut 20 is screwed onto this male screw. In this drawing, the rotary shaft 16 is illustrated in a hollow cylindrical shape, but the configuration of the rotary shaft 16 is not limited to a specific one as far as the rotary shaft 16 is concentric to the rotor core 12, and has an outer circumferential surface having a circular cross section. Hence, the rotary shaft 16 may be as a solid round bar shape, or may be formed with a coolant flow passage therein.

The washer 18 and the nut 20, together with the flange 26, restrict movement of the rotor core 12 in the axial direction, and also applies a compression force in the axial direction to the rotor core 12. The rotary shaft 16 is inserted through the washer 18 from its end portion opposite to the flange 26 so that the washer 18 comes into contact with an axial end surface of the rotor core 12. The nut 20 is mounted onto the rotary shaft 16 from its end portion opposite to the flange 26 so as to be screwed with the male screw formed on the rotary shaft 16. By being fastened with this nut 20, the rotor core 12 is held between the washer 18 and the flange 26 so as to restrict the movement in the axial direction, and also receive a compression force (axial force) in the axial direction.

Figure 9:
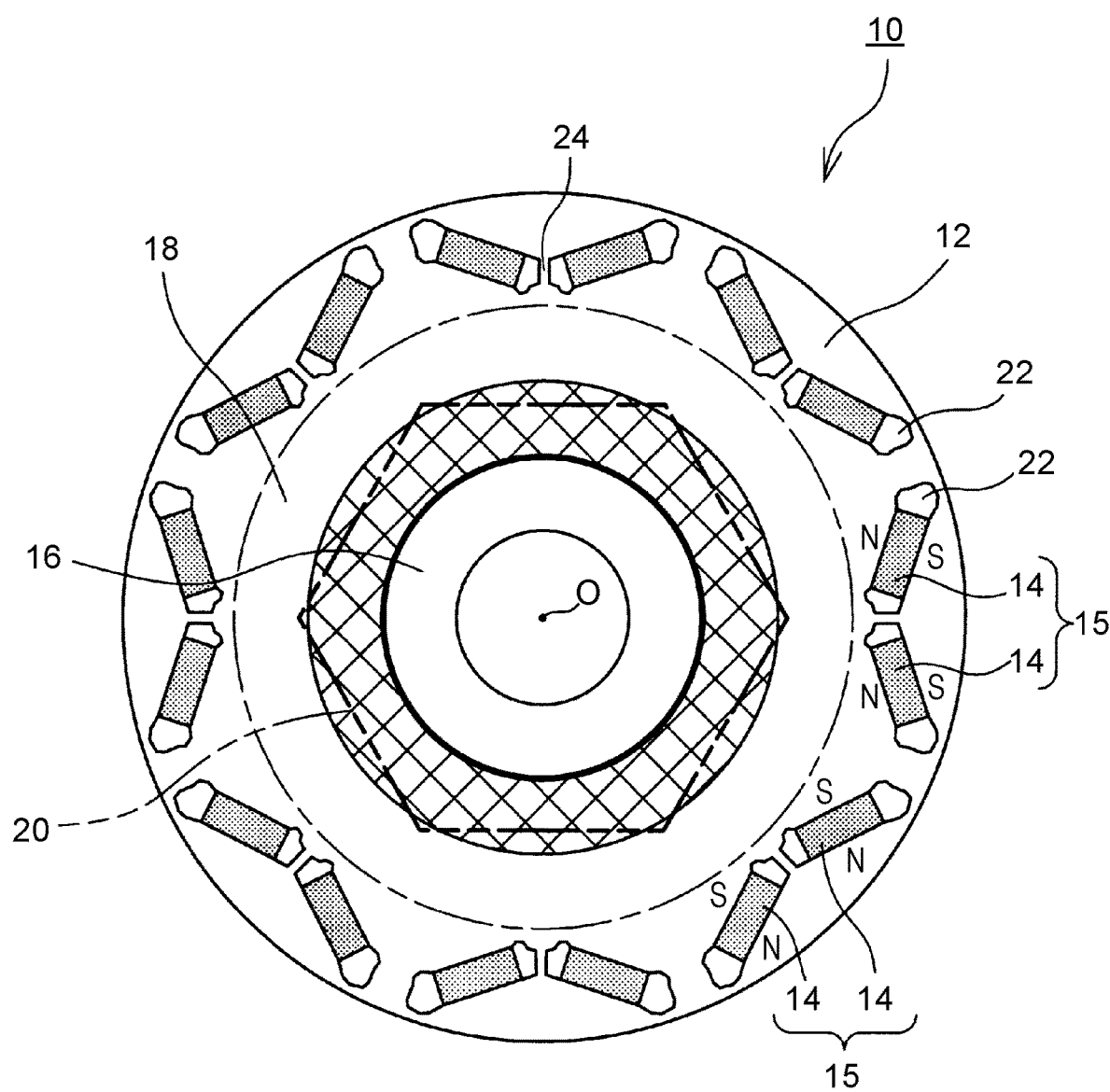
FIG. 9 is a view showing a conventional rotor.

Here, in the rotor 10 disclosed in the present specification, for the purpose of preventing local deterioration of the rotor core 12, or the like while sufficiently securing the axial force applied to the rotor core 12, the washer 18 is configured to have a special shape. This will be described in comparison with the background art. FIG. 9 is an example of the rotor 10 of the background art.

When the axial force applied to the rotor core 12 becomes decreased, a fixing force for the rotor core 12 becomes naturally decreased. When the axial force is decreased, gaps between the electromagnetic steel plates composing the rotor core 12 become greater, so that leakage of the coolant from the gaps occurs. Hence, it is desired to apply a sufficient axial force to the rotor core 12.

In order to enhance the axial force applied to the rotor core 12, naturally, a fastening force by the nut 20 may be increased. However, in the configuration of the background art, the washer 18 is configured to have an annular shape the diameter of which is substantially the same as that of the nut 20, so that the washer 18 is in contact with the rotor core 12 by a radially inward area one third as large as the rotor core 12. Hence, if the fastening force by the nut 20 is increased, a great fastening force (axial force) is applied to only this radially inward area one third as large as the rotor core 12; consequently, it is difficult to apply a sufficient axial force to the entire rotor core 12.

To cope with this, it is natural to consider to increase the area of the washer 18. However, in order to prevent a magnetic short-circuit and heat radiation of the permanent magnet 14, as well as other considerations, it is preferable that the washer 18 does not cover the permanent magnet 14. To cope with this, for example, it can be considered that the outer diameter of the washer 18 in an annular shape is enlarged to the vicinity of the inner circumferential ends of the magnet holes 22. With such a configuration, a fastening force by the nut 20 can be distributed in a wider area, and thus it is possible to apply a sufficient axial force to the entire rotor core 12.

However, if the outer diameter of the annular washer 18 is simply enlarged, force is applied to the vicinities of the bridges 24 the rigidities of which are locally decreased. In this case, a stress caused in the rotor core 12 by applying the fastening force is likely to be concentrated on the bridges 24 the rigidities of which are decreased. Consequently, other problems, such as deterioration and breakage of the bridges 24, are caused.

To cope with this, in the rotor 10 disclosed in the present specification, the washer 18 is configured to have a special shape. That is, as shown in FIG. 2 and FIG. 3, the outer circumferential shape of the washer 18 of this example is located more radially inward than the magnet holes 22, and a distance from a rotation center O to the outer circumferential end of the washer 18 periodically varies in the circumferential direction so as to have a shape with recesses and projections. In addition, as shown in FIG. 3, the washer 18 has such a shape that a distance D1 from the outer circumferential end of the washer 18 to each bridge 24 is not less than a distance D2 from the outer circumferential end of the washer 18 to each magnet hole 22. Here, each of the distance D1 and the distance D2 means a minimum distance. For example, the "distance D2 from the outer circumferential end of the washer 18 to each magnet hole 22" means a width of the gap at a position where the width of the gap between the outer circumferential end of the washer 18 to this magnet hole 22 becomes the smallest. Similarly, the "distance D1 from the outer circumferential end of the washer 18 to each bridge 24" means a width of the gap at a position where the width of the gap between the outer circumferential end of the washer 18 and this bridge 24 becomes the smallest.

The shape of the washer 18 is more specifically described as follows. The outer circumferential shape of the washer 18 is a generally flower-like shape or a generally gear-like shape having round corners. The generally flower-like shape and the generally gear-like shape each include projecting portions 18a, each in an arc shape projecting radially outward, and recessed portions 18b, each in an arc shape recessed radially inward, the projecting portions 18a and the recessed portions 18b being arranged alternately with each other in the circumferential direction. Such a variable period of the recesses and projections of the outer circumferential shape of the washer 18 coincides with an arrangement pitch of the magnetic poles 15, or an arrangement pitch of the bridges 24 as the low-rigidity portions. In the present example, there are eight magnetic poles 15 and eight bridges 24, and each arrangement pitch thereof is 360/8=45°; therefore, the projections and the recesses of the outer circumferential shape of the washer 18 vary with a period of 45°.

In addition, the washer 18 is disposed such that a center point (hereinafter, referred to as a "recess point 19") of each recessed portion 18b, where a distance from the rotation center to the outer circumferential end of the washer 18 becomes minimum, is located in the same phase as that of each bridge 24. In other words, the washer 18 is disposed such that each recess point 19 and each bridge 24 are aligned in a straight line in the radial direction.

Hence, the outer circumferential shape of the washer 18 is similar to a shape formed by connecting lines obtained by offsetting inner circumferential ends of the magnet holes 22 disposed in a generally V-shape arrangement toward a radially inward direction. However, the washer 18 has an opening angle α1 at a position corresponding to the V-shape that is smaller than an opening angle α2 at this position of each magnet hole 22, so that the washer 18 has a V-shape deeper radially inward than that of the magnet hole 22. As a result, the distance D1 from the outer circumferential end of the washer 18 to the bridge 24 is not less than a distance D2 from the outer circumferential end of the washer 18 to the magnet hole 22.

In this manner, since the distance from the outer circumferential end of the washer 18 to each bridge 24 becomes greater, it becomes more difficult to apply force to the vicinity of each bridge 24 rigidity of which is locally decreased, thus suppressing stress concentration onto the bridge 24. Accordingly, it is possible to effectively suppress deterioration and damages of the bridges 24. In the meantime, of the washer 18, each portion the phase of which deviates from the bridge 24 extends more radially outward than the rotor 10 of the background art, and thus an axial force can be applied in a wide range of the rotor core 12. Accordingly, according to the washer 18 of the present example, it is possible to prevent local deterioration of the rotor core 12, or the like, while securing a sufficient axial force applied to the rotor core 12.

In order to suppress the stress concentration onto the bridges 24, it is necessary to align the phase of each recess point 19 of the washer 18 with the phase of each bridge 24. Hence, in the rotor 10 disclosed in the present specification, in order to align the phase of the washer 18 with the phase of the rotor core 12, the washer 18 is key-engaged with the rotary shaft 16. Specifically, an inner circumferential surface of the washer 18 is provided with key-projections 30 projecting radially inward, and the outer circumferential surface of the rotary shaft 16 is provided with key-grooves 32 accepting the key-projections 30. The washer 18 is assembled to the rotary shaft 16 such that the key-projections 30 are fitted into the key-grooves 32, to thereby restrict the phase of the washer 18 relative to the rotor core 12 in a preferable manner.

In the present example, the washer 18 is provided with the key-projections 30, and the rotary shaft 16 is provided with the key-grooves 32, but this combination may be inverted to each other. This means that the rotary shaft 16 may be provided with the key-projections, and the washer 18 may be provided with the key-grooves. The number of the key-grooves 32 and the number of the key-projections 30 may appropriately be changed.

Figure 5:
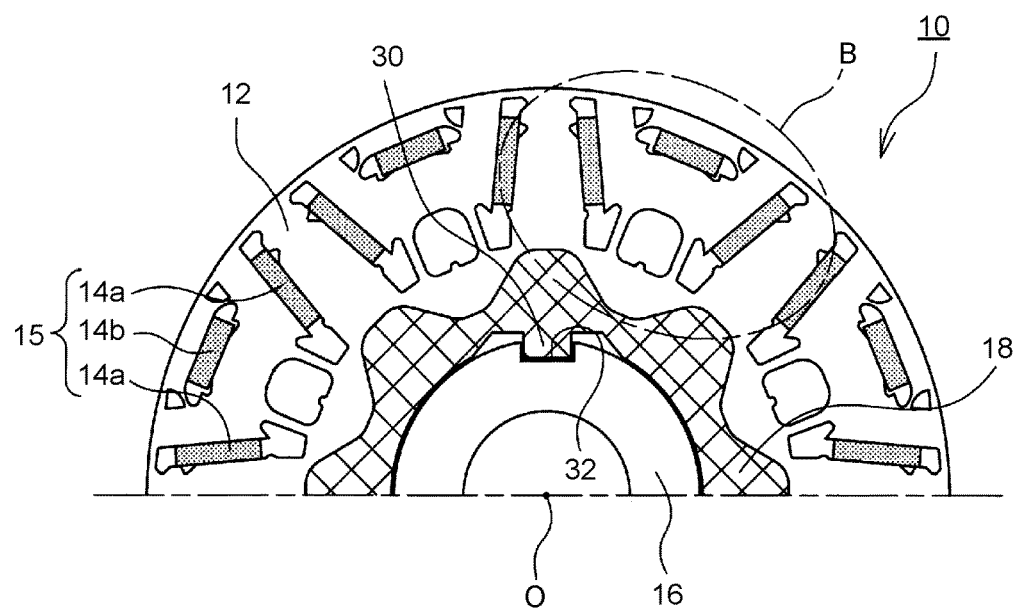
FIG. 5 is a view showing a rotor according to another exemplary embodiment.
Figure 6:
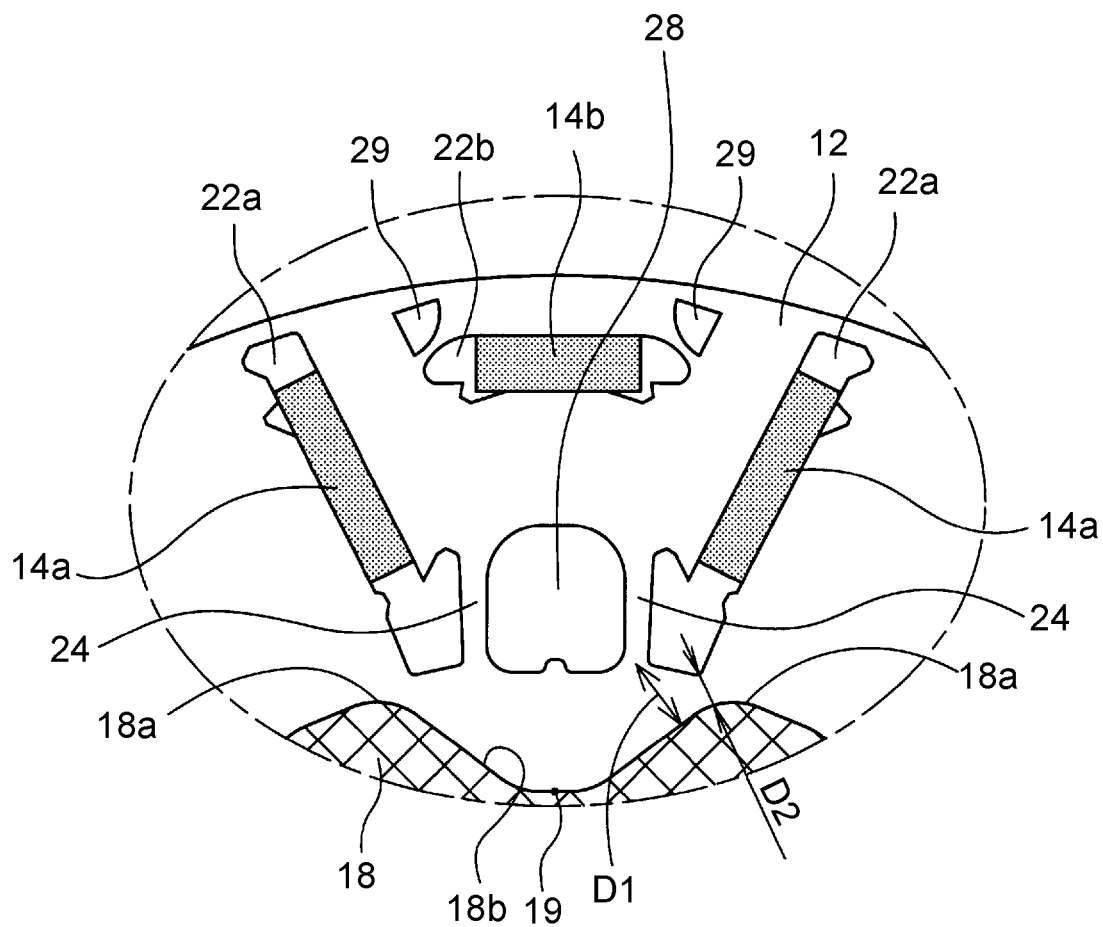
FIG. 6 is an enlarged view of a part B of FIG. 5.

Next, another example of the rotor 10 will be described. FIG. 5 is a view showing one example of a rotor 10 according to another exemplary embodiment. FIG. 6 is an enlarged view of a part B of FIG. 5. In this rotor 10, each single magnetic pole 15 is composed by three permanent magnets 14a, 14b arranged in an inverted triangle shape (subscripts are omitted when the permanent magnets 14a, 14b of two types are not distinguished from each other. This is the same in the magnet holes described later). That is, each single magnetic pole 15 is composed by a pair of the permanent magnets 14a arranged in a V-shape opening radially outward and one permanent magnet 14b disposed between respective outer circumferential ends of the pair of the permanent magnets 14a.

The rotor core 12 is formed with the magnet holes 22 for accepting the permanent magnets 14. Each pair of the magnet holes 22a are arranged in a V-shape opening radially outward. Note that these two magnet holes 22a are not close to each other in the circumferential direction, but there is an intermediate hole 28 between respective inner circumferential ends of the two magnet holes 22a. Each intermediate hole 28 is a through-hole extending through the rotor core 12 in the axial direction. This intermediate hole 28 functions as a magnetic resisting portion, and by providing the intermediate hole 28, magnetic flux flows can be regulated. Here, as apparent from FIG. 6, the bridge 24 as a fine gap portion rigidity of which is locally decreased is formed between each intermediate hole 28 and each magnet hole 22a.

In addition, a magnet hole 22b extending in the circumferential direction is formed between respective outer circumferential ends of every two magnet holes 22a. A pair of void holes 29 are formed on both circumferential sides of each magnet hole 22b. As similar to the intermediate hole 28, each void hole 29 is a through-hole extending through the rotor core 12 in the axial direction, and functions as a magnetic resisting portion. This void hole 29 is also provided so as to regulate the magnetic flux flows.

In examples shown in FIG. 5 and FIG. 6, the washer 18 is disposed on the axial end surface of the rotor core 12, and the washer 18 is pushed against the rotor core 12 with a fastening force by the nut 20 (not illustrated in FIG. 5 and FIG. 6). As similar to the example shown in FIG. 2, the outer circumferential shape of the washer 18 of this example is located more radially inward than the magnet holes 22, and the distance thereof from the rotation center O to the outer circumferential end periodically varies in the circumferential direction so as to have a shape with recesses and projections. In addition, as shown in FIG. 6, the washer 18 has such a shape that a distance D1 from the outer circumferential end of the washer 18 to each bridge 24 is not less than a distance D2 from the outer circumferential end of the washer 18 to each magnet hole 22.

To be more specific, the outer circumferential shape of the washer 18 is a generally flower-like shape or a generally gear-like shape having round corners. The generally flower-like shape and the generally gear-like shape each include the projecting portions 18a, each in an arc shape projecting radially outward, and the recessed portions 18b, each in an arc shape recessed radially inward, the projecting portions 18a and the recessed portions 18b being arranged alternately with each other in the circumferential direction. The variable period of the recesses and projections of the outer circumferential shape of the washer 18 coincides with the arrangement pitch of the magnetic poles 15.

In addition, the washer 18 is disposed such that each recess point 19, where a distance from the rotation center to the outer circumferential end of the washer 18 becomes minimum, is located in the same phase as that of the circumferential center of the intermediate hole 28. In other words, the washer 18 is disposed such that each recess point 19 and the circumferential center of each intermediate hole 28 are aligned in a straight line in the radial direction. With such a configuration, it is possible to reduce the stress concentration onto the bridges 24, and it is also possible to apply an axial force in a wide range of the rotor core 12.

Figure 7:
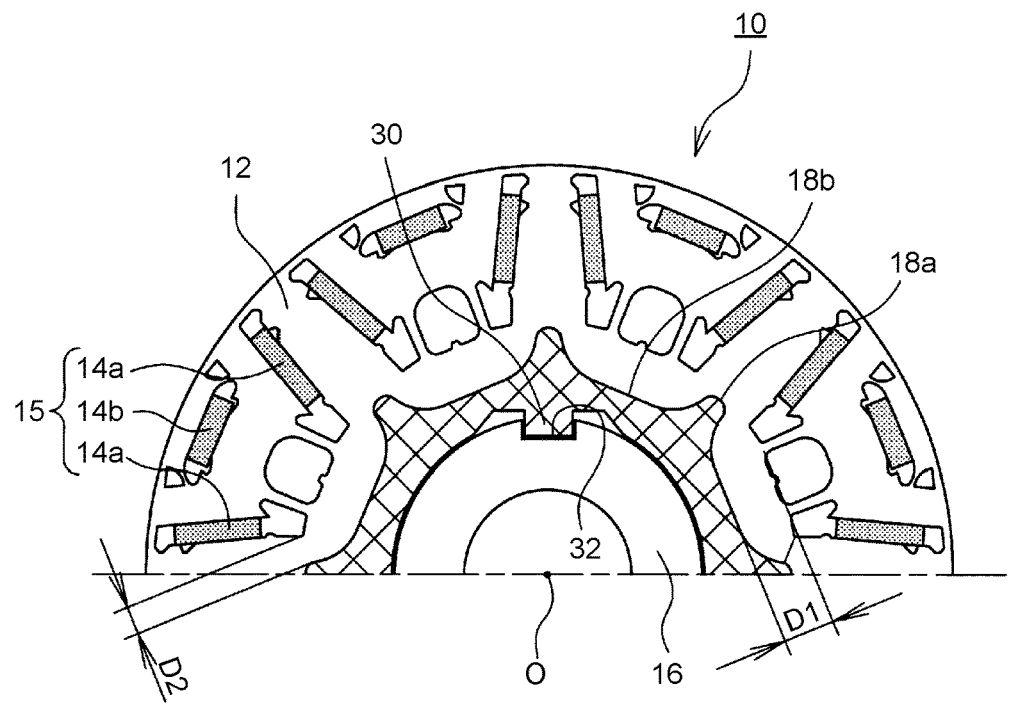
FIG. 7 is a view showing a rotor according to another exemplary embodiment.

Note that each recessed portion 18b is formed in a generally arc shape recessed radially inward in the examples of FIG. 5 and FIG. 6, but this recessed portion 18b may be a straight shape extending in the generally circumferential direction, as shown in FIG. 7. With such a configuration, compared with the cases of FIG. 5 and the FIG. 6, the distance D1 from the outer circumferential end of the washer 18 to the bridge 24 can be greater, to thus suppress more stress concentration onto each bridge 24.

Figure 8:
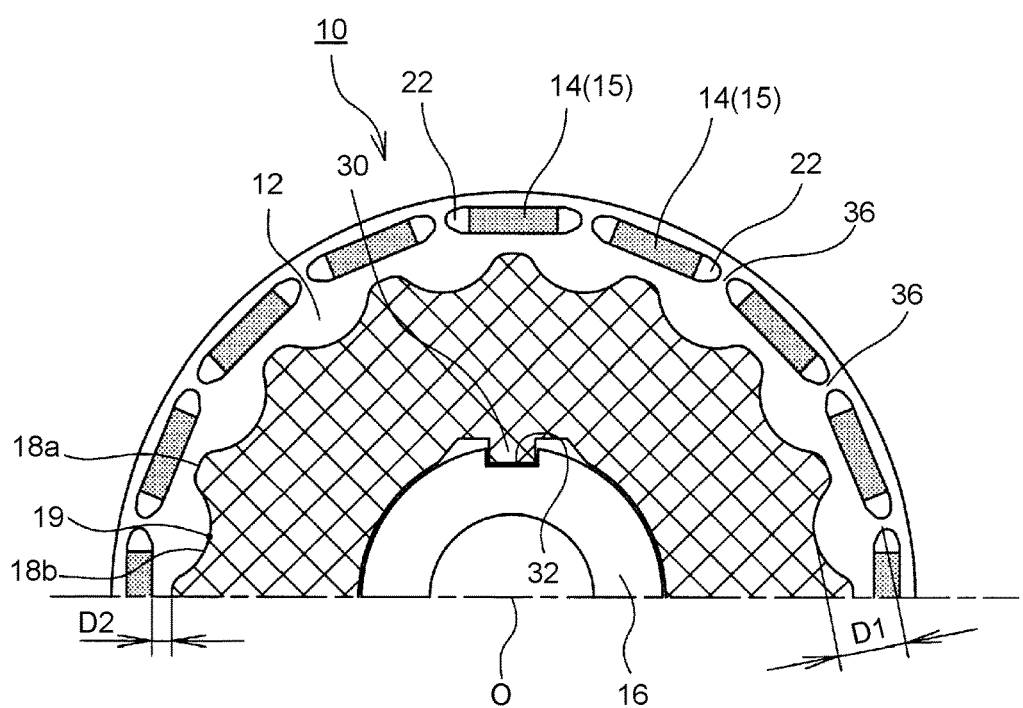
FIG. 8 is a view showing a rotor according to another exemplary embodiment.

Next, another exemplary embodiment of the rotor 10 will be described. FIG. 8 is a view showing another exemplary rotor 10. In this rotor 10, each single magnetic pole 15 is formed by a single permanent magnet 14 that is long in the generally circumferential direction. In the example of FIG. 8, the rotor 10 includes sixteen magnetic poles 15 and sixteen permanent magnets 14.

The rotor core 12 is formed with the magnet holes 22 for accepting these permanent magnets 14. Each magnet hole 22 is a flat rectangular shape that is long in the generally circumferential direction, and a long axial dimension is greater than a long axial dimension of the permanent magnet 14. A gap portion 36 having a thin width is formed between each two magnet holes 22 adjacent to each other in the circumferential direction. It can be said that this gap portion 36 is a low-rigidity portion rigidity of which is locally decreased, as with the above described bridge 24.

As with the washer 18 shown in FIG. 2, the washer 18 in tight contact with this rotor core 12 has an outer circumferential shape located more radially inward than the magnet holes 22, and having recesses and projections in which the distance from the rotation center O to the outer circumferential end periodically varies in the circumferential direction. In addition, as shown in FIG. 8, the washer 18 has such a shape that the distance D1 from the outer circumferential end of the washer 18 to each gap portion 36 is not less than the distance D2 from the outer circumferential end of the washer 18 to each magnet hole 22.

To be more specific, the outer circumferential shape of the washer 18 is a generally flower-like shape or a generally star-like shape having round corners. The generally flower-like shape and the generally star-like shape each include projecting portions 18a, each in an arc shape projecting radially outward, and recessed portions 18b, each in an arc shape recessed radially inward, the projecting portions 18a and the recessed portions 18b being arranged alternately with each other in the circumferential direction. The variable period of the recesses and projections of the outer circumferential shape of the washer 18 coincides with the arrangement pitch of the magnetic poles 15.

In addition, the washer 18 is disposed such that the circumferential center point of each recessed portion 18b (hereinafter, referred to as a "recess point 19"), where the distance from the rotation center O to the outer circumferential end of the washer 18 becomes minimum, is located in the same phase as that of the gap portion 36. In other words, the washer 18 is disposed such that each recess point 19 and the gap portion 36 are aligned in a straight line in the radial direction. With such a configuration, it is possible to reduce the stress concentration onto the gap portions 36, and it is also possible to apply an axial force in a wide range of the rotor core 12.

As apparent from the above description, according to the rotor 10 disclosed in the present specification, it is possible to reduce stress applied onto the low-rigidity portions. The configurations disclosed in the present specification are exemplary embodiments, and as far as the distance from the outer circumferential end of the washer to each low-rigidity portion is not less than the distance from the outer circumferential end of the washer to each magnet hole, the other configurations may appropriately be changed. For example, in the above description, the washer 18 is formed in a generally gear-like shape corners of which are all round, but may be formed in a generally gear-like shape having sharp corners. However, in order to avoid overconcentration of stress onto a single local position, it is preferable to avoid sharp corners for the outer circumferential shape of the washer 18, as much as possible.

What is claimed is:

1. A rotor for a rotary electric machine comprising:
   a rotor core having a generally annular shape with a shaft hole at a center, the rotor core including a plurality of magnet holes arranged in a circumferential direction, the rotor core including at least one low-rigidity portion;
   a plurality of magnets disposed in the respective magnet holes;
   a rotary shaft fixedly attached to the shaft hole of the rotor core;
   a washer flush with at least one end surface of the rotor core in an axial direction of the rotor core; and
   a nut screwed onto the rotary shaft such that the washer is pushed against the rotor core, wherein
   an outer circumferential end of the washer is disposed more radially inward than the magnet holes,
   the washer has an outer circumferential shape with recesses and projections in which a distance from a rotation center to the outer circumferential end of the washer periodically varies, and
   a distance from the outer circumferential end of the washer to each low-rigidity portion is greater than a distance from the outer circumferential end of the washer to each magnet hole.

2. The rotor for the rotary electric machine according to claim 1, wherein
   the rotor core includes a plurality of pairs of magnet holes in the circumferential direction, each pair of the magnet holes arranged in a V-shape opening radially outward,
   each bridge is a gap provided between each pair of the magnet holes, and
   the bridge is the low-rigidity portion.

3. The rotor for the rotary electric machine according to claim 2, wherein
   the washer is disposed such that when each recess is in the same phase as a phase of each low-rigidity portion, a distance from the rotation center to the outer circumferential end becomes smallest.

4. The rotor for the rotary electric machine according to claim 1, wherein
   the rotor core includes the magnet holes, each magnet hole extending in the circumferential direction, and the low-rigidity portion is the gap between the magnet holes adjacent to each other in the circumferential direction.

5. The rotor for the rotary electric machine according to claim 4, wherein
   the washer is disposed such that when each recess is in the same phase as a phase of each low-rigidity portion, a distance from the rotation center to the outer circumferential end becomes smallest.

6. The rotor for the rotary electric machine according to claim 1, wherein
   the rotor core has a plurality of sets of through-holes in the circumferential direction, each set of the through-holes including: a pair of the magnet holes arranged circumferentially adjacent to each other in a V-shape opening radially outward; and an intermediate hole being disposed between the pair of the magnet holes, and
   each low-rigidity portion is a bridge that is a gap between each magnet hole and each intermediate hole.

7. The rotor for the rotary electric machine according to claim 6, wherein the washer is disposed such that when each recess is in the same phase as a phase of the intermediate hole, the distance from the rotation center to the outer circumferential end becomes smallest.

8. The rotor for the rotary electric machine according to claim 1, wherein the outer circumferential shape of the washer is a gear-like shape having round corners.

9. The rotor for the rotary electric machine according to claim 1, wherein
one of an inner circumferential surface of the washer and an outer circumferential surface of the rotary shaft includes key-projections projecting toward the other of the inner circumferential surface of the washer and the outer circumferential surface of the rotary shaft, and
the other of the inner circumferential surface of the washer and the outer circumferential surface of the rotary shaft has key-grooves accepting the key-projections.

10. The rotor for the rotary electric machine according to claim 1, wherein the at least one low-rigidity portion is an area of the rotor that has a rigidity less than the rigidity of another portion of the rotor.

11. A rotor for a rotary electric machine comprising:
a rotor core having a generally annular shape including a shaft hole along a central axis, a plurality of magnet holes arranged circumferentially around the rotor core, and at least one low-rigidity portion;
a plurality of magnets disposed in the respective magnet holes;
a rotary shaft disposed within the shaft hole;
a washer flush with at least one end surface of the rotor core in an axial direction of the rotor core; and
a nut provided on the rotary shaft such that the washer is continuously urged against the rotor core, wherein
an outer circumference of the washer includes recesses and projections such that a distance from a rotation center to the outer circumferential end of the washer varies, and
a distance from the outer circumferential end of the washer to each low-rigidity portion is greater than a distance from the outer circumferential end of the washer to each magnet hole.

12. The rotor for the rotary electric machine according to claim 11, wherein the at least one low-rigidity portion is an area of the rotor that has a rigidity less than the rigidity of another portion of the rotor.

\* \* \* \* \*